United States Patent
Würsig

(10) Patent No.: US 7,143,752 B2
(45) Date of Patent: Dec. 5, 2006

(54) PREHEATING OF INLET AIR

(75) Inventor: Lars Würsig, Malmback (SE)

(73) Assignee: Aktiebolaget Electrolux, Stockholm (SE)

( * ) Notice: Subject to any disclaimer, the term of this patent is extended or adjusted under 35 U.S.C. 154(b) by 59 days.

(21) Appl. No.: 10/490,561

(22) PCT Filed: Sep. 17, 2002

(86) PCT No.: PCT/SE02/01676

§ 371 (c)(1),
(2), (4) Date: Oct. 6, 2004

(87) PCT Pub. No.: WO03/027478

PCT Pub. Date: Apr. 3, 2003

(65) Prior Publication Data

US 2005/0028794 A1    Feb. 10, 2005

(30) Foreign Application Priority Data

Sep. 27, 2001   (SE) .................................. 0103236

(51) Int. Cl.
*F02M 31/14* (2006.01)
(52) U.S. Cl. .................................................. 123/556
(58) Field of Classification Search ................ 123/556
See application file for complete search history.

(56) References Cited

U.S. PATENT DOCUMENTS

| | | | | |
|---|---|---|---|---|
| RE15,069 E * | 3/1921 | Macfarren | ................ | 217/12 A |
| 1,425,054 A * | 8/1922 | Ricardo | .................... | 123/41.35 |
| 4,175,524 A * | 11/1979 | Coddington | ................ | 123/552 |
| 4,365,607 A * | 12/1982 | Ishikawa | ..................... | 123/556 |
| 4,526,156 A | 7/1985 | Briche | | |
| 4,632,084 A * | 12/1986 | Eriksson | ..................... | 123/556 |
| 4,716,860 A * | 1/1988 | Henriksson et al. | ..... | 123/41.05 |
| 4,846,136 A * | 7/1989 | Phillips | ...................... | 123/556 |
| 4,890,595 A * | 1/1990 | Fischer | ........................ | 123/556 |
| 6,779,514 B1 * | 8/2004 | Zimmermann et al. | ..... | 123/556 |

FOREIGN PATENT DOCUMENTS

DE          3523949 A1     1/1987

OTHER PUBLICATIONS

Patent Abstract of Japan, vol. 004, No. 154, Oct. 28, 1980 & JP 55104561 A, Aug. 11, 1980, abstract.

* cited by examiner

*Primary Examiner*—Marguerite McMahon
(74) *Attorney, Agent, or Firm*—Pearne & Gordon LLP

(57) ABSTRACT

The claimed invention relates to a device for preheating of the inlet air to a combustion engine that powers a portable tool. The preheating of the air is activated when the surrounding temperature is low and deactivated when there is no need for preheating of the inlet air. When the preheating is activated is the air led through a first channel (14) that is integrated in the wall of a crankcase (10) so that the air is heated. When there is no need for preheating is the inlet air lead via a second channel (16) placed outside the crankcase (10).

7 Claims, 2 Drawing Sheets

PREHEATING OF INLET AIR

Figure 1:
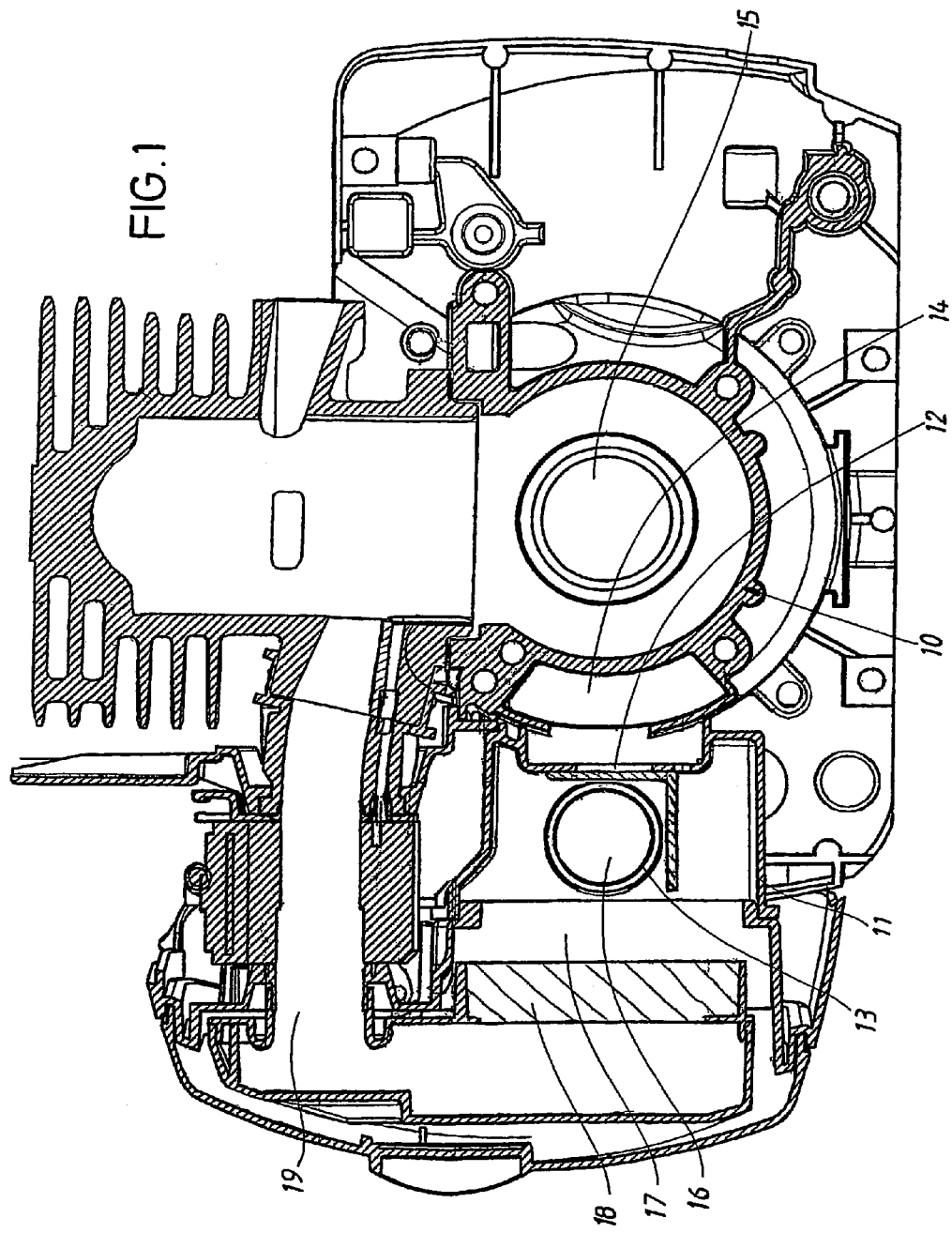

This application claims the benefit of International Application Ser. No. PCT/SE02/01676, which was published in English on Apr. 3, 2003.

Modern combustion engine powered portable tools like for example chain saws, clearing saws and trimmers are used all around the year no matter of season and the surrounding temperature. The big variations in the surrounding conditions increases the strain on the tools and makes it complicated to design a tool that works satisfying in all possible surrounding air temperatures and humidities.

Low surrounding air temperatures means that several functions of the tool will be affected in a negative way. For example is there a risk that narrow passages like the air inlet will be blocked by freezing water, problems to provide the different parts in the tool with enough lubrication as well as difficulties to get reliable ignition of the fuel in the engine.

One solution that improves the performance of the tool when the surrounding temperature is low is to preheat the inlet air to the engine. A higher temperature of the inlet air reduces the risk that the filter for the inlet air will be blocked by freezing water which will increase the reliability of the engine and make the ignition of the fuel less fluctuating.

There are some different known solutions in order to provide preheating of the inlet air to the engine but all the known solutions have drawbacks since they either are complicated, takes a lot of space or not are effective enough. Solutions that are complicated and needs a lot of space could not be used for tools that are supposed to be carried by the operator during long shifts.

One known solution for heating of inlet air to an engine is illustrated in the Patent Document DE 3523949A where the heated air for cooling of the cylinder is lead to the inlet for the carburettor. This solution, however, has the drawback that the temperature of the inlet air will fluctuate and not provide enough heating of the inlet air when the surrounding temperature is low.

The solution that is illustrated in the attached drawings and defined in the claims is an effective and less complicated solution to the described problem. A device for preheating of the inlet air that could be activated when there is a need for preheating achieves this. The fact that the device only is activated when there is a need for preheating of the inlet air to the engine makes it possible to design a device that is very effective.

The principle for the claimed invention is that air is lead through different channels to the engine depending on if preheating is required or not. If there is no need for preheating is the air lead through a channel placed outside the crankcase to the carburettor. When there is a need for preheating and the device is actuated is the inlet air led through a channel integrated in the wall of the crankcase so that the heat generated from the combustion in the engine is used for preheating of the air in the channel before the air reaches the carburettor.

This solution also has the advantage that the integrated channel in the wall of the crankcase works as a cooler of the crankcase so that the components placed close to the crankcase is exposed to less heat.

One embodiment of the claimed invention is illustrated in the drawings.

FIG. 1. Illustrates a vertical cross section through an engine provided with the claimed device for preheating of the inlet air.

Figure 2:
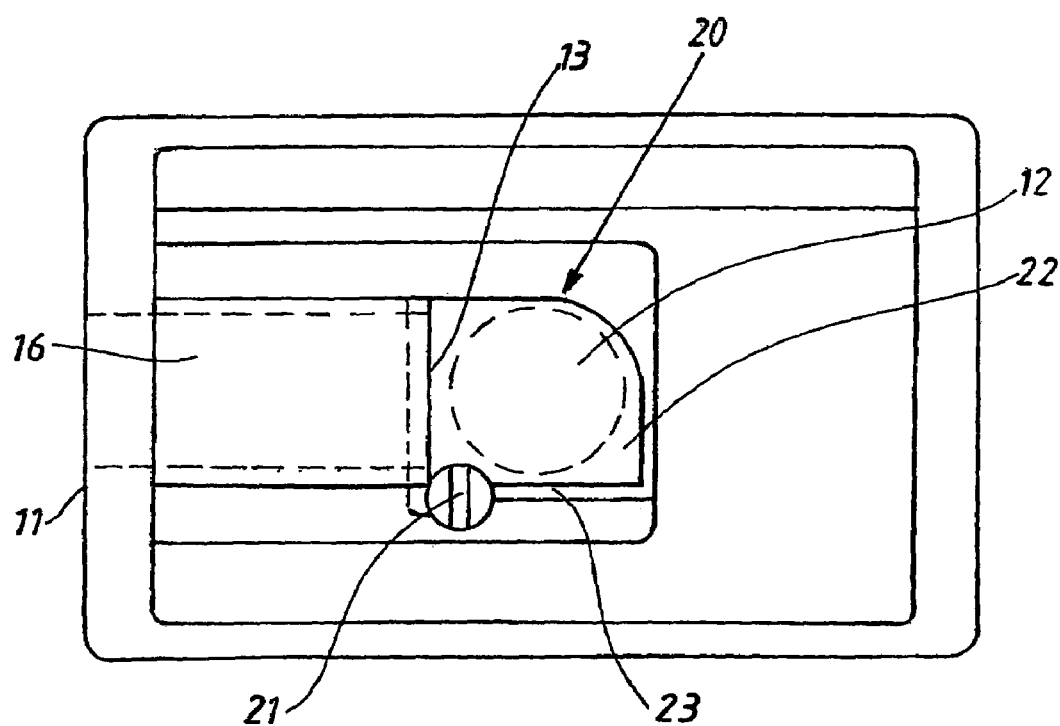

FIG. 2. Illustrates a side view of a section of the device in FIG. 1.

In FIG. 1 is the relevant parts of a crankcase 10 and related parts to a combustion engine powered clearing saw illustrated. The air to the engine enters a non-illustrated air inlet and is then lead to a box-shaped muffler 11. The box-shaped muffler 11 divides into two different passages 12 and 13 for the air. The first passage 12 is placed in the bottom of the box-shaped muffler 11 and is used when the air needs preheating while the second passage 13 is placed so that the entrance to the passage 13 is perpendicular to the entrance to the first passage 12 and at a distance above the bottom of the box-shaped muffler 11. The second passage 13 is used when there is no need for preheating of the air.

The first passage 12 reaches a channel 14 that first points towards the centre of the crankcase 10 but is turned so that the channel 14 is lead inside the wall of the crankcase 10 in a direction parallel to the crank shaft 15. When the engine is running are the walls in the crankcase 10 heated. The warm walls heat the air in the channel 14 so that the temperature of the air is increased during low surrounding temperatures.

The second passage 13 reaches also a channel 16. This channel 16 is lead parallel to the other cannel 14 but is placed outside the wall of the crankcase 10. This channel 16 is used when there is no need for preheating of the air.

The two channels 14 and 16 are converges into a third channel 17. In the third channel 17 is a filter 18 placed in order to clean the air further before the air reaches the carburettor 19.

A lever 20 actuates the preheating of the air. The lever 20 comprises two lids 22 and 23 that are placed between the two passages 12 and 13 in the box-shaped muffler 11. A screw 21 turns the lever 20 between two positions. In the first position is the passage 12 open and the passage 13 closed by the lid 23 so that air is lead through the wall of the crankcase 10 so that the air is heated. In the other position does the lid 22 close the passage 12 while the passage 13 is open so that there is no heating of the air.

The invention claimed is:

1. Device for preheating of the inlet air to a combustion engine powered portable tool, said device is activated or deactivated depending on the need of preheating of the inlet air, said tool comprising crankcase (10), a crankshaft (15) and a carburettor (19), characterised in that the inlet air to the carburettor (19) is led via a first channel (14) that is integrated in the crankcase (10) when the preheating of the inlet air is activated and led via a second channel (16) placed outside the crankcase (10) when the the preheating of the inlet air is deactivated; and characterised in that the inlet air enters a muffler (11) and then continues via the selected first or the second channel (14, 16) to an air filter (18) before it reaches the carburettor (19).

2. Device according to claim 1, characterised in that the preheating is activated or deactivated by a lever (20).

3. Device according to claim 2, characterised in that the lever (20) is turned between two different positions, one position where the preheating is activated and another position where the preheating not is activated.

4. Device according to claim 3, characterised in that the preheating is activated by turning a screw (21) on the lever (20) so that the lever is placed in a position where the entrance to the first channel (14) is open and the second channel (16) is closed and deactivated by turning the lever (20) into a position where the entrance to the first channel (14) is closed and the second channel (16) is open.

5. Device according to any of the claims 2–4, characterised in that the lever (20) comprises two lids (22, 23) that covers the entrances (12, 13) to the first and the second channel (14, 16).

6. Device according to claim 1, characterised in that first channel (14) is placed inside the crankcase (10) wall.

7. Device according to claim 6, characterised in that the axial direction of the first channel (14) is parallel to the axial direction of the crankshaft (15).

* * * * *